United States Patent
Burger

(10) Patent No.: US 6,490,947 B2
(45) Date of Patent: Dec. 10, 2002

(54) SPRING FOR ATTACHING CABLE END FITTING TO BRACKET

(76) Inventor: Arnd Burger, Munster Kamp 9 D-37574, Einbeck (DE)

( * ) Notice: Subject to any disclaimer, the term of this patent is extended or adjusted under 35 U.S.C. 154(b) by 0 days.

(21) Appl. No.: 10/021,379

(22) Filed: Oct. 30, 2001

(65) Prior Publication Data

US 2002/0053253 A1 May 9, 2002

Related U.S. Application Data

(62) Division of application No. 09/602,820, filed on Jun. 23, 2000, now abandoned.

(51) Int. Cl.⁷ ............................. F16C 1/10; F16L 5/00
(52) U.S. Cl. .................. 74/502.4; 74/502.6; 248/56
(58) Field of Search .............. 74/502.4, 502.6, 74/501.5 R; 248/56, 27.3; 285/243; 403/316; 439/545

(56) References Cited

U.S. PATENT DOCUMENTS

| | | | |
|---|---|---|---|
| 2,543,997 A | 3/1951 | Vavra et al. .................. 248/68 |
| 2,744,769 A | * 5/1956 | Roeder et al. ................ 285/6.5 |
| 3,163,712 A | 12/1964 | Cochran .................... 174/164 |
| 3,205,727 A | * 9/1965 | Sevrence .................... 74/501 |
| 3,229,026 A | 1/1966 | Sulzer ......................... 174/65 |
| 3,366,356 A | 1/1968 | Fisher ......................... 248/56 |
| 3,432,129 A | 3/1969 | Santucci ...................... 248/69 |
| 3,631,738 A | 1/1972 | Harper ........................ 74/501 |
| 3,944,177 A | 3/1976 | Yoda .......................... 248/74 |
| 3,954,238 A | 5/1976 | Nivet .......................... 248/68 |
| 4,061,299 A | 12/1977 | Kurosaki ..................... 248/73 |
| 4,177,691 A | 12/1979 | Fillmore ...................... 74/501 |
| 4,339,213 A | 7/1982 | Gilmore ..................... 403/316 |
| 4,346,863 A | 8/1982 | Zeitrager et al. .............. 248/75 |
| 4,400,992 A | * 8/1983 | Londres .................... 74/501 R |
| 4,407,042 A | 10/1983 | Schramme et al. .............. 16/2 |
| 4,458,552 A | 7/1984 | Spease et al. ................. 74/501 |
| 4,601,448 A | 7/1986 | Miyazaki et al. ............. 248/56 |

(List continued on next page.)

FOREIGN PATENT DOCUMENTS

| | | | | |
|---|---|---|---|---|
| DE | 2439404 | | 2/1976 | |
| DE | 3731149 A1 | * | 3/1989 | ................ 74/502.4 |
| DE | 4116911 A1 | * | 10/1991 | ................ 74/502.4 |
| EP | 0223470 | | 5/1987 | |
| EP | 0239984 | | 10/1987 | |
| EP | 0365243 | | 4/1990 | |
| EP | 1041296 | | 10/2000 | |
| FR | 2756879 | | 6/1998 | |
| FR | 2781262 | | 1/2000 | |
| FR | 2791742 | | 6/2000 | |
| WO | WO 93/04488 | * | 3/1993 | ................ 74/502.6 |

*Primary Examiner*—Vinh T. Luong
(74) *Attorney, Agent, or Firm*—Howard & Howard

(57) ABSTRACT

A support wall (16) has a predetermined thickness (18) between opposite surfaces and an inwardly extending periphery defining a pocket (20). A fitting (21) defining an annular groove (22) and the periphery of the pocket (20) is disposed in the groove (22) whereby the support wall (16) supports the fitting (21). First and second projections (38) are disposed on the support wall (16). A U-shaped retainer clip (24) has legs (26) extending from a base (28) and terminating in distal ends (30) with the base (28) and the legs (26) disposed in the groove (22). The distal ends (30) extend out of the groove (22) and engage the projections (38) for retaining the fitting (21) in the pocket (20).

3 Claims, 2 Drawing Sheets

U.S. PATENT DOCUMENTS

| | | | |
|---|---|---|---|
| 4,614,321 A | 9/1986 | Andre | 248/74.2 |
| 4,642,859 A | 2/1987 | Kaiser | 24/669 |
| 4,763,541 A | 8/1988 | Spease | 74/501 |
| 4,889,006 A * | 12/1989 | Kolinske et al. | 74/502.4 |
| 4,951,524 A | 8/1990 | Niskanen | 74/502.4 |
| 5,046,380 A * | 9/1991 | Matsumoto et al. | 74/502.6 |
| 5,086,662 A * | 2/1992 | Tayon et al. | 74/501.5 R |
| 5,105,682 A | 4/1992 | Jung | 74/502.4 |
| 5,347,882 A | 9/1994 | Klotz | 74/502.4 |
| 5,414,218 A * | 5/1995 | Nathan | 174/15.1 |
| 5,518,332 A * | 5/1996 | Katoh | 403/155 |
| 5,865,066 A * | 2/1999 | Osborn et al. | 74/502.4 |
| 5,887,487 A * | 3/1999 | Bravo | 74/502.4 |
| 6,171,141 B1 * | 1/2001 | Yasui et al. | 439/545 |
| 6,178,844 B1 * | 1/2001 | Burger | 74/205.4 |
| 6,340,265 B1 * | 1/2002 | Suzuki et al. | 403/316 |

* cited by examiner

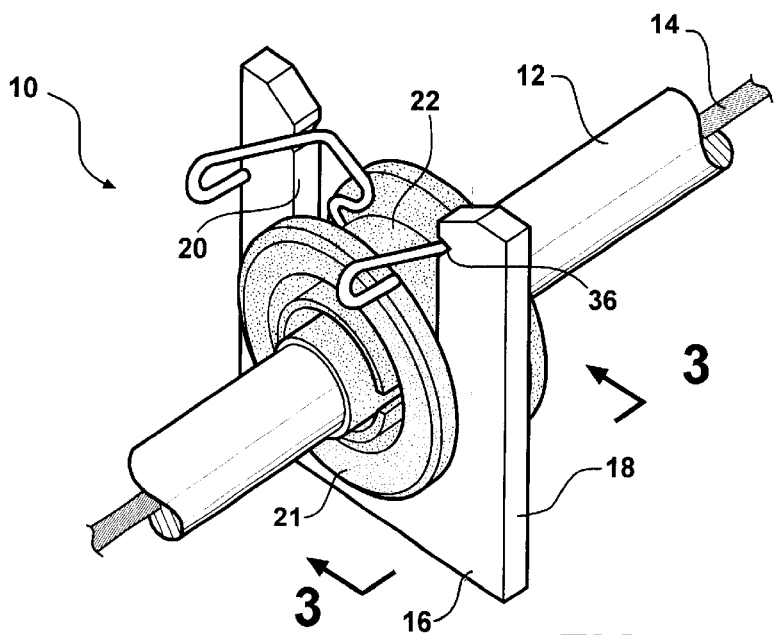
FIG - 1
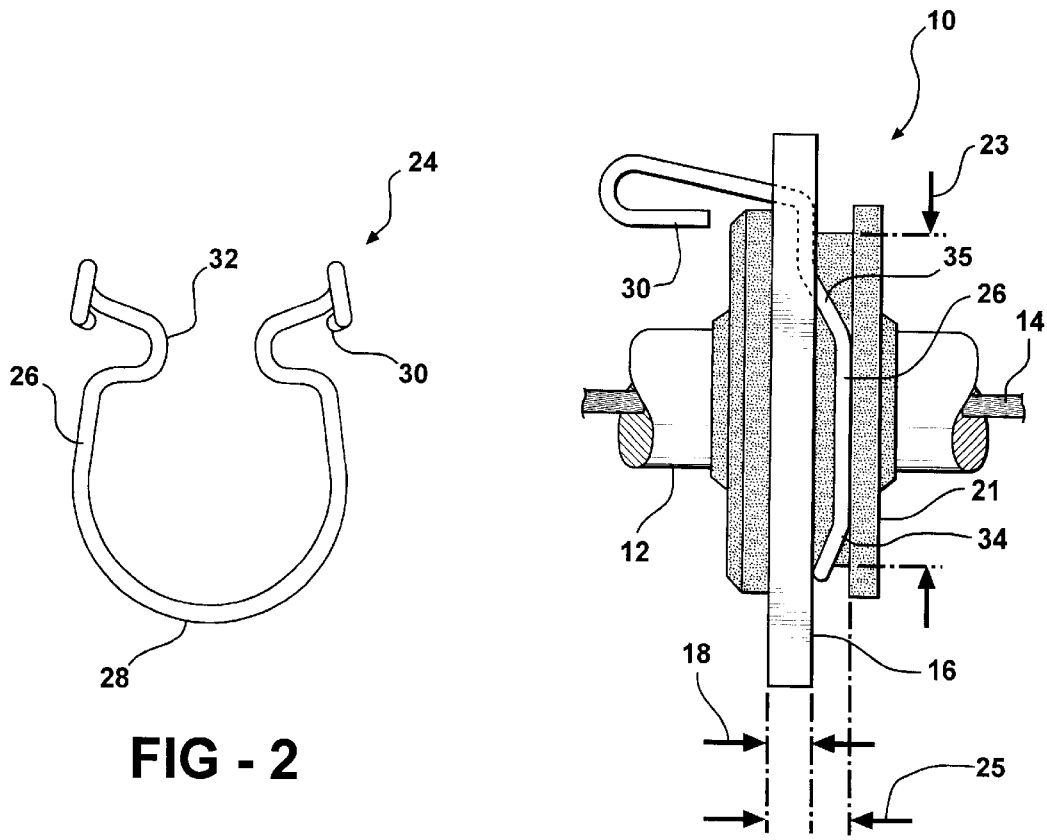
FIG - 2
FIG - 3

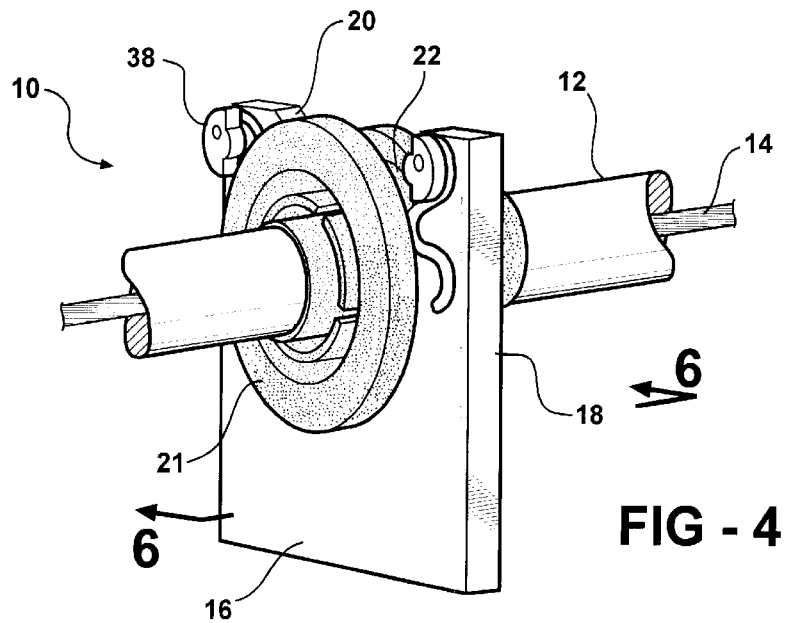
FIG - 4
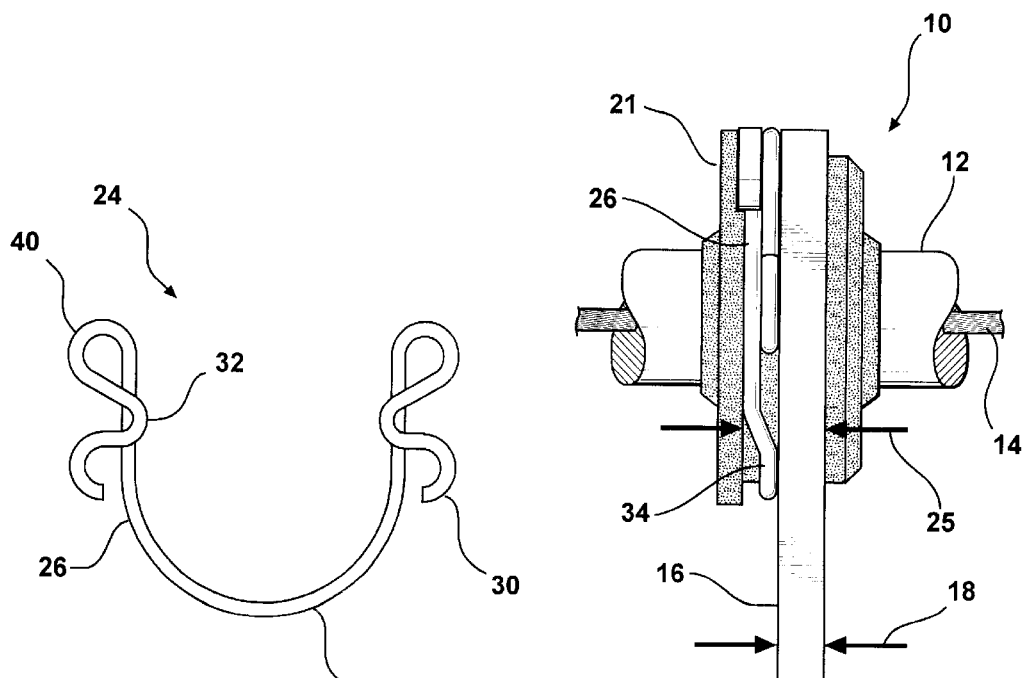
FIG - 5    FIG - 6

SPRING FOR ATTACHING CABLE END FITTING TO BRACKET

RELATED APPLICATION

This application is a divisional of application Ser. No. 09/602,820 filed Jun. 23, 2000, now abandoned.

BACKGROUND OF THE INVENTION

1) Technical Field

This invention relates to a motion transmitting remote control assembly which is normally operated to control a device by transmitting tension or compression in a curved path by means of a flexible motion transmitting core element, and, more specifically, to a fitting for mounting the conduit to a support structure.

2) Description of the Prior Art

Motion transmitting remote control assemblies of the type that utilize a flexible conduit having a slidable inner core require attachment to a support structure for holding the conduit stationary while the inner core is moved axially. A typical support structure is a wall having an aperture through which the conduit must be threaded during assembly. Holding the conduit stationary relative to the support structure has required a fitting affixed to the conduit and having a snap fit feature whereby the fitting locks into the aperture. This attachment design makes the conduit difficult to remove from the support structure causing the fitting to break frequently during repair operations. An example of such an assembly is disclosed by the U.S. Pat. No. 4,458,552 to Spease. Spease discloses a substantially U-shaped retaining member removably slidably mounted on a conduit fitting and having a pair of stubs for engaging an opposite surface of a support structure through an aperture. An alternate design is disclosed by the U.S. Pat. No. 4,339,213 to Gilmore, who teaches a support structure having a U-shaped slot into which a conduit fitting having an annular groove is slidably inserted. The fitting is affixed by a coil spring surrounding the conduit and having a tip which engages an aperture in the support structure. The Spease '552 patent does not facilitate a quick release of the fitting from the support structure, while the Gilmore '213 patent does not provide axial support for the conduit.

SUMMARY OF THE INVENTION AND ADVANTAGES

A motion transmitting remote control assembly of the type for transmitting forces along a curved path by a motion transmitting core element includes a guide means and a motion transmitting core element moveably supported by the guide means. A support wall for supporting the guide means has a predetermined thickness between opposite surfaces and an inwardly extending periphery defining a pocket. The guide means includes a fitting defining an annular groove. The groove has a predetermined diameter and a predetermined width perpendicular to the diameter. The periphery of the pocket is disposed in the groove whereby the support wall supports the fitting. First and second abutments are disposed on the support wall. A U-shaped retainer clip has legs extending from a base and terminating in distal ends with the base and the legs disposed in the groove. The distal ends extend out of the groove and engage the abutments for retaining the fitting in the pocket.

The subject invention provides the ability for quick release of the conduit from the support wall via the catches. In addition, a more stable engagement between the fitting and the support wall is provided by the axial undulation in the clip which provides axial bias between the wall and the fitting. These features provide a superior motion transmitting remote control assembly over the prior art.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a first embodiment of a motion transmitting remote control assembly;

FIG. 2 is a side elevational view of the first embodiment of the motion transmitting remote control assembly;

FIG. 3 is front view of the first embodiment of a spring clip shown as a wire;

FIG. 4 is a perspective view of a second embodiment of a motion transmitting remote control assembly constructed in accordance with the subject invention;

FIG. 5 is a side elevational view of the second embodiment of the motion transmitting remote control assembly; and FIG. 6 is front view of the second embodiment of a spring clip shown as a wire.

DETAILED DESCRIPTION OF THE PREFERRED EMBODIMENT

Referring to the Figures, wherein like numerals indicate like or corresponding parts throughout the several views, a motion transmitting remote control assembly of the type for transmitting forces along a curved path by a motion transmitting core element is generally shown at 10. The assembly 10 includes a guide means and a motion transmitting core element 14 moveably supported by the guide means. As shown in the Figures, the guide means includes a conduit 12 which typically comprises an inner tubular member surrounded by long lay wires wound helically and encased in a tubular casing. The guide means also includes a plastic fitting 21 affixed to or molded about the conduit 12. The fitting 21 defines an annular groove 22 having a predetermined diameter 23 and a predetermined width 25 perpendicular to the diameter 23.

The assembly 10 includes a support wall 16 having a predetermined thickness 18 between opposite surfaces and an inwardly extending periphery defining a pocket 20. The periphery of the pocket 20 is disposed in the groove 22 whereby the support wall 16 supports the fitting 21. The predetermined thickness 18 of the support wall 16 is less than the predetermined width 25 of the groove 22 allowing for additional space after the support wall 16 has been disposed in the groove 22. First and second abutments 36,38 are disposed on the support wall 16. Alternate embodiments of the abutments 36,38 are described hereinbelow.

The instant invention is characterized by a U-shaped retainer clip 24 having legs 26 terminating in distal ends 30 extending from a base 28, the base 28 and the legs 26 of which are disposed in the groove 22. The distal ends 30 extend out of the groove 22 and engage the abutments 36,38 for retaining the fitting 21 in the pocket 20. Each of the distal ends 30 includes a catch 32. The distance between the catches 32 is less than the predetermined diameter 23 whereby the clip 24 is retained in the groove 22.

The retainer clip 24 comprises a wire with the legs 26 thereof being movable relative to one another in a springlike action. The wire includes at least one undulation 34 axially for providing an axially directed biasing force between the wall 16 and the fitting 21. For example, during push pull operation, the conduit 12 can derive axial force due to the frictional force from axial movement of the core element 14 causing the fitting 21 to move relative to the support wall 16. The movement causes the undulation 34 to flex at a predetermined axial force for providing a continuous biasing between the wall 16 and the fitting 21. FIGS. 1–3 show a clip 24 having a second undulation 35 located on the legs 26.

A first embodiment of the clip 24 is shown in FIGS. 1–3 wherein the distal ends 30 are biased apart and into engagement with the abutments 36. The abutments 36 comprise notches 36 extending axially through opposite sides of the pocket 20. The distal ends 30 extend through the catches 32 and then axially for disposition into the notches 36. Manually biasing together the distal ends 30 disengages the distal ends 30 from the notches 36 and allows the fitting 21 to be removed from the support wall 16.

An alternate embodiment of the clip 24 is shown in FIGS. 4–6 wherein the distal ends 30 are biased together for engagement with the abutments 38. This embodiment shows the abutments 38 comprising male projections or studs 38 extending axially from the support wall 16, and the distal ends 30 forming loops 40 for clasping the studs 38. Manually biasing apart the distal ends 30 loosens the clasp from the studs 38 and allow the clip 24 to be moved axially away from the studs 38 subsequently releasing the fitting 21 from the support wall 16. In addition, forcing the fitting 21 upward biases the distal ends 30 apart widening the distance between the catches 32 and allowing the fitting 21 to be separated from the support wall 16 while the clip 21 remains clasping the studs 38.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) comprising:

a guide means;

a motion transmitting core element (14) moveably supported by said guide means;

a support wall (16) having a predetermined thickness (18) between opposite surfaces and an inwardly extending periphery defining a pocket (20);

said guide means including a fitting (21) defining an annular groove (22), said groove (22) having a predetermined diameter (23) and a predetermined width (25) perpendicular to said diameter (23);

said periphery of said pocket (20) being disposed in said groove (22) whereby said support wall (16) supports said fitting (21);

first and second abutments in the form of male projections (38) extending axially from said support wall (16);

a U-shaped retainer clip (24) having legs (26) terminating in distal ends (30) and extending from a base (28) with said base (28) and said legs (26) disposed about said fitting (21), said distal ends (30) engaging said projections (38) for retaining said fitting (21) in said pocket (20).

2. An assembly (10) as set forth in claim 1 wherein said distal ends (30) form loops (40) for clasping said projections (38).

3. An assembly (10) as set forth in claim 2 wherein said distal ends (30) are biased together and into engagement with said projections (38).

* * * * *